(No Model.)

T. W. LAMBERT.
NUT LOCK.

No. 306,931. Patented Oct. 21, 1884.

WITNESSES
Villette Anderson.
John T. Morrow.

INVENTOR
T. W. Lambert
by Anderson & Smith
his ATTORNEYS

UNITED STATES PATENT OFFICE.

THOMPSON W. LAMBERT, OF AVIS, VIRGINIA.

NUT-LOCK.

SPECIFICATION forming part of Letters Patent No. 306,931, dated October 21, 1884.

Application filed March 13, 1884. (No model.)

*To all whom it may concern:*

Be it known that I, THOMPSON W. LAMBERT, a citizen of the United States, residing at Avis, in the county of Augusta and State of Virginia, have invented certain new and useful Improvements in Nut-Locks; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
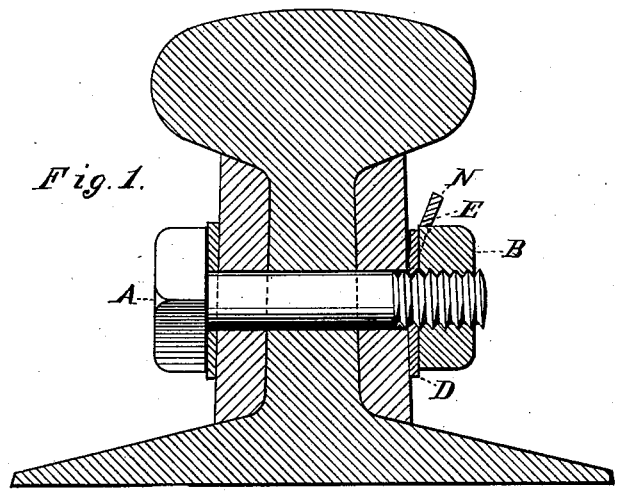
Figure 2:
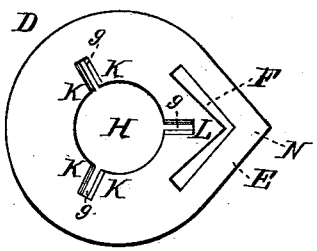
Figure 3:
Figure 4:
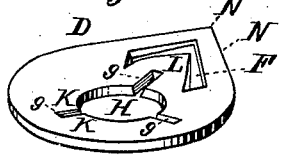

Figure 1 of the drawings is a vertical transverse section of a rail, showing my device applied. Fig. 2 is a plan view of the nut-locking washer. Fig. 3 is a vertical sectional view of the same, and Fig. 4 is a perspective view of the same.

This invention has relation to nut-locking washers; and it consists in the construction and novel arrangement of the concavo-convex washer-plate having a slotted corner-extension and radial cuts dividing the portion around the central bolt-opening into broad tongues, adapted, when the washer is pressed down by the nut, to engage the threads thereof with sufficient firmness to hold the washer from turning, all as hereinafter set forth.

In the accompanying drawings, the letter A designates a bolt, and B the nut engaging the threaded portion thereof. C is a bearing, and D is the nut-locking washer. This washer is made, usually, in circular form for about three-fourths of its circumference, and is provided with corner-extension E, which is slotted in an angular or sharply-curved manner, as is indicated at F. The washer is made of sheet-iron, malleable iron, or steel, and is made concavo convex, the outer face being concave and the inner face or bottom convex. Radial V-shaped cuts or notches g are made around the central opening, H, separating the portion which borders the opening into broad spring-tongues K K. The washer may be made with more than one slotted corner-extension, if thought advisable; but one will usually be found sufficient. The portion L within the slot forms an elastic tongue, which is lightened or thinned on top, so that it will allow the nut to pass over it freely when being turned. The outer V-form or bow tongue, N, is lightened underneath, so that it will spring easily, rising when the nut is in proper position to engage a corner thereof and prevent reversing. As the V-form locking tongue is connected to the body of the washer at both ends, it is strong and not liable to be broken. When the nut is turned down firmly, the washer underneath will be flattened, and the broad tongues K K thereof will be extended at their inner ends toward the center in a forcible manner. They will therefore engage the thread of the bolt and hold the washer thereto by friction, so that it will not turn upon the bolt.

Having described this invention, what I claim, and desire to secure by Letters Patent, is—

The concavo-convex washer-plate having a slotted corner-extension, and radial cuts dividing the portion around the central opening into broad tongues, adapted, when the washer is pressed down by the nut, to engage the threads thereof with sufficient firmness to hold the washer from turning, substantially as specified.

In testimony whereof I affix my signature in presence of two witnesses.

THOMPSON W. LAMBERT.

Witnesses:
JOSHUA W. HARRIS,
JOHN E. GARNER.